United States Patent
Min et al.

(10) Patent No.: US 10,630,110 B2
(45) Date of Patent: Apr. 21, 2020

(54) WIRELESS POWER TRANSMITTER AND METHOD FOR CONTROLLING SAMPLING IN WIRELESS POWER TRANSMITTER

(71) Applicant: SAMSUNG ELECTRO-MECHANICS CO., LTD., Suwon-si (KR)

(72) Inventors: Sang Hyun Min, Suwon-si (KR); Jae Hyung Lee, Suwon-si (KR); Kwang Mook Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 435 days.

(21) Appl. No.: 15/665,524

(22) Filed: Aug. 1, 2017

(65) Prior Publication Data

US 2018/0123396 A1 May 3, 2018

(30) Foreign Application Priority Data

Oct. 31, 2016 (KR) .......................... 10-2016-0143658

(51) Int. Cl.
| | |
|---|---|
| *H04L 27/00* | (2006.01) |
| *H02J 50/12* | (2016.01) |
| *H04B 5/00* | (2006.01) |
| *H04L 27/10* | (2006.01) |
| *H02J 50/80* | (2016.01) |

(52) U.S. Cl.
CPC ............ *H02J 50/12* (2016.02); *H04B 5/0037* (2013.01); *H04L 27/10* (2013.01); *H02J 50/80* (2016.02)

(58) Field of Classification Search
CPC ........ H02J 50/12; H02J 50/80; H04B 5/0037; H04L 27/10; H04L 27/2695; G08C 19/00
USPC .................................................. 375/295, 355
See application file for complete search history.

(56) References Cited

U.S. PATENT DOCUMENTS

| | | | |
|---|---|---|---|
| 2011/0066053 A1 | 3/2011 | Yazicioglu | |
| 2013/0181539 A1* | 7/2013 | Muratov | ................. H01F 38/14 307/104 |
| 2013/0259167 A1 | 10/2013 | Yoon et al. | |
| 2013/0342023 A1* | 12/2013 | Li | ........................... H02J 5/005 307/104 |
| 2014/0049422 A1* | 2/2014 | Von Novak | ............. H02J 50/12 342/146 |
| 2014/0319921 A1* | 10/2014 | Lisi | ........................... G05F 1/12 307/104 |

FOREIGN PATENT DOCUMENTS

KR  10-2013-0110269 A  10/2013

\* cited by examiner

*Primary Examiner* — Don N Vo
(74) *Attorney, Agent, or Firm* — NSIP Law

(57) ABSTRACT

A wireless power transmitter includes a sampling controller setting different retrieval sampling points of time for each section, among candidate sampling points of time, in each section of a carrier frequency signal; and a sampling unit configured to sample points of the carrier frequency signal at the different retrieval sampling points of time. The sampling controller compares values sampled by the sampling unit with each other, and determines a determined sampling point based on a comparison result.

20 Claims, 8 Drawing Sheets

WIRELESS POWER TRANSMITTER AND METHOD FOR CONTROLLING SAMPLING IN WIRELESS POWER TRANSMITTER

CROSS-REFERENCE TO RELATED APPLICATION(S)

This application claims benefit under 35 USC 119(a) of Korean Patent Application No. 10-2016-0143658, filed on Oct. 31, 2016 in the Korean Intellectual Property Office, the disclosure of which is incorporated herein by reference for all purposes.

BACKGROUND

1. Field

The present disclosure relates to a wireless power transmitter and a method for controlling a sampling in the wireless power transmitter.

2. Description of Related Art

Unlike in general mobile communications, a transmitter and a receiver of a wireless power transmission system not only transmit and receive power wirelessly, but also communicate wirelessly with each other. Such wireless communications require modulation and demodulation of a signal, and the modulation and demodulation may require a sampling of the signal.

Wireless communications in a wireless power transmission system may be greatly influenced by the relationship of the positions of the transmitter and the receiver. For example, the accuracy of the modulation and demodulation of the signal is influenced by the positional relationship of the transmitter and the receiver.

As sampling frequency increases, the accuracy of the modulation and demodulation may be improved. However, as the sampling frequency increases, the cost, required size, and power consumption of the transmitter and receiver of the wireless power transmission system may increase.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wireless power transmitter includes a sampling controller setting different retrieval sampling points of time for each section, among candidate sampling points of time, in each section of a carrier frequency signal; and a sampling unit configured to sample points of the carrier frequency signal at the different retrieval sampling points of time. The sampling controller compares values sampled by the sampling unit with each other, and determines a determined sampling point based on a comparison result.

The sampling unit may sample at a point of time corresponding to the determined sampling point for each of the plurality of sections of the carrier frequency signal.

The wireless power transmitter may further include a demodulator that detects a phase or an envelope of the carrier frequency signal, based on the determined sampling point.

The determined sampling point may be the largest value or the smallest value of the values sampled by the sampling unit.

The sections may include first to n-th sections. The candidate sampling points of time includes first to n-th points. The sampling controller may set a k-th point of a k-th section as the sampling point of time, where n and k are natural numbers and n is greater than k.

A time difference between a retrieval sampling point of time of one of the sections and a retrieval sampling point of time of an adjacent section may be [(n+1)/n] multiples of a period of one of the plurality of sections, where n is a natural number.

The sampling controller may determine whether a state of the transmitter satisfies a retrieval condition in every reference period, and when the state satisfies the retrieval condition, resets different retrieval sampling points of time for each section among the candidate sampling points of time.

The wireless power transmitter may further include a converter having switches configured to switch based on a frequency of the carrier frequency signal to generate wireless power or the carrier frequency signal. The retrieval condition may include a first case in which an operation frequency of the converter is changed and a second case in which a duty cycle of the converter is changed.

The wireless power transmitter may further include a sensor sensing a level of voltage or current of a second node through which the carrier frequency signal passes in the transmitter. The second node may be different from a sampling node of the sampling unit. The retrieval condition may include a third case in which the level of the voltage or the current sensed by the sensing unit is changed to at least a reference level.

The sampling controller may receive information on a level of voltage or current of a load from a wireless power receiver, and the retrieval condition may include a fourth case in which the level of the voltage or the current of the load is changed to at least a reference level.

The wireless power transmitter may further include a coil disposed on the transmitter and transmitting power wirelessly to a receiver, and the sampling unit may be configured to sample a level of voltage or current of the coil.

In another general aspect, a method for controlling a sampling of a wireless power transmitter includes setting different retrieval sampling points of time for each section among candidate sampling points of time in each section of a carrier frequency signal; sampling points of the carrier frequency signal at the different retrieval sampling points of time; and comparing values sampled by the sampling unit with each other and determining a determined sampling point based on a comparison result.

The method may further include performing the sampling at a point of time corresponding to the determined sampling point for each section of the carrier frequency signal; receiving information on a level of voltage or current of a load from a wireless power receiver in every reference period; and when the level of the voltage or the current of the load is changed to at least a reference level, resetting different retrieval sampling points of time for each of the sections among the candidate sampling points of time.

In another general aspect, a wireless power transmitter is configured to determine n candidate sampling points of time for sections of a carrier frequency signal, determine one of k retrieval sampling points for each of the candidate sampling points of time, sample the carrier frequency signal based on the selected sampling point of time, wherein n and k are natural numbers, and n is greater than k.

A sampling controller may set the retrieval sampling points and a sampling unit may perform the sampling based on the retrieval sampling points of time.

The carrier frequency signal may be sampled at a sampling frequency of $[(n/(n+1)]$ times the carrier frequency.

When the candidate sampling points of time is an odd number, a k-th retrieval sampling point of time may correspond to a (2k)-th candidate sampling point of time, and a (2k−1)-th candidate sampling point of time may correspond to a $[(n/2)+k]$-th retrieval sampling point of time.

The sampling points of time may be selected as points of time at which the carrier frequency signal has a positive peak value.

Additional sampling points of time may be selected as points of time at which the carrier frequency signal has a negative peak value.

An amplitude or an envelope of the carrier frequency signal may be determined based on a value obtained by dividing a sum of absolute values of the sampling points of time and the additional sampling points of time in half.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
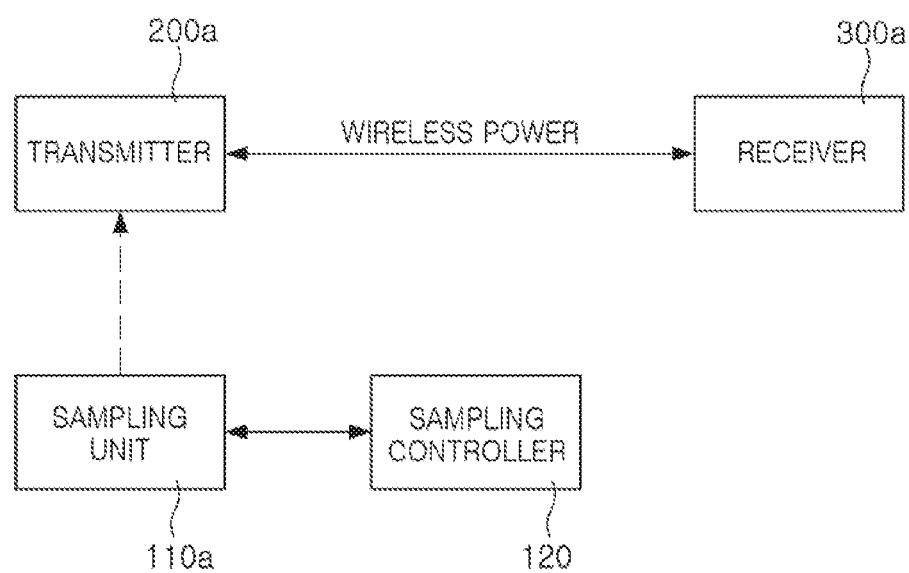
FIG. 1 is a block diagram schematically illustrating an example of a sampling control in a wireless power transmission system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a block diagram schematically illustrating a sampling control in a wireless power transmission system.

A sampling unit 110a samples points through which a carrier frequency signal passes in a transmitter 200a of a wireless power transmission system. For example, the sampling unit 110a may include a coil, a capacitor, a switch, and a matching circuit.

Here, the carrier frequency signal refers to a wireless power signal and/or a wireless power communications signal, and the sampling refers to measuring electrical data, such as a voltage, at a frequency of a sampling frequency per second. The carrier frequency may be varied based on standards (WPC, PMA, etc.) of the wireless power transmission system, but may be 125 kHz.

Typically, a signal having a specific frequency, such as the carrier frequency signal, has a form similar to a sine wave, and has an envelope specified by amplitude and frequency. Typically, a transmitter and a receiver of the wireless power transmission system share frequency information related to the carrier frequency signal with each other. The amplitude or the envelope corresponds to information communicated between the transmitter and the receiver, and may be varied in every predetermined period. That is, the transmitter 200a and the receiver 300 of the wireless power transmission system may communicate with each other using ASK (Amplitude Shift Keying) modulation or OOK (On Off Keying) modulation. Here, the sampling unit 110a performs a sampling to detect the amplitude or the envelope.

However, since the signal having the specific frequency, such as the carrier frequency signal, has the electrical data corresponding to a phase, it is difficult for the sampling unit 110a to detect the amplitude or the envelope of the carrier frequency signal when the phase information at a point of time of performing the sampling is not known, even if the sampling unit 110a performs the sampling once per period of the carrier frequency signal.

The sampling unit 110a may detect the amplitude or the envelope of the carrier frequency signal by performing the sampling at a sampling frequency higher than a frequency of the carrier frequency signal, but may end up being expensive, require a large size, and have high power consumption.

Therefore, the sampling unit 110a receives information on the sampling point of time from the sampling controller 120, to detect the amplitude or the envelope of the carrier frequency signal without increasing the sampling frequency.

The sampling controller 120 sets different retrieval sampling points of time for each of the sections among a plurality of candidate sampling points of time included in each of a plurality of sections of the carrier frequency signal. For example, the length of the plurality of sections may be equal to the period of the carrier frequency signal, the plurality of candidate sampling points of time may each correspond to different phases of the carrier frequency signal, and the retrieval sampling points of time may correspond to different phases.

Thereafter, the sampling unit 110a samples the points through which the carrier frequency signal passes in the wireless power transmission system at the different retrieval sampling points of time.

Thereafter, the sampling controller 120 compares values sampled by the sampling unit 110a with each other, and selects at least one of the sampled values, based on a comparison result. For example, the sampling controller 120 may select a peak value among the sampled values. As a result, the sampling controller 120 may select a sampling point of time at which the sampling unit 110a may sample the peak value.

Thereafter, the sampling unit 110a samples a sampling point of time of the value selected by the sampling controller 120 in every plurality of sections after the sampling controller 120 selects the value. For example, in a case in which the sampling controller 120 selects the peak value among the sampled values, the sampling unit 110a may perform the sampling whenever the carrier frequency signal has the peak value.

As a result, the sampling unit 110a detects the amplitude or the envelope of the carrier frequency signal even if the sampling unit 110a performs the sampling once per the period of the carrier frequency signal. That is, the sampling unit 110a may have an effect similar to that of increasing the sampling frequency without actually increasing the sampling frequency.

Figure 2:
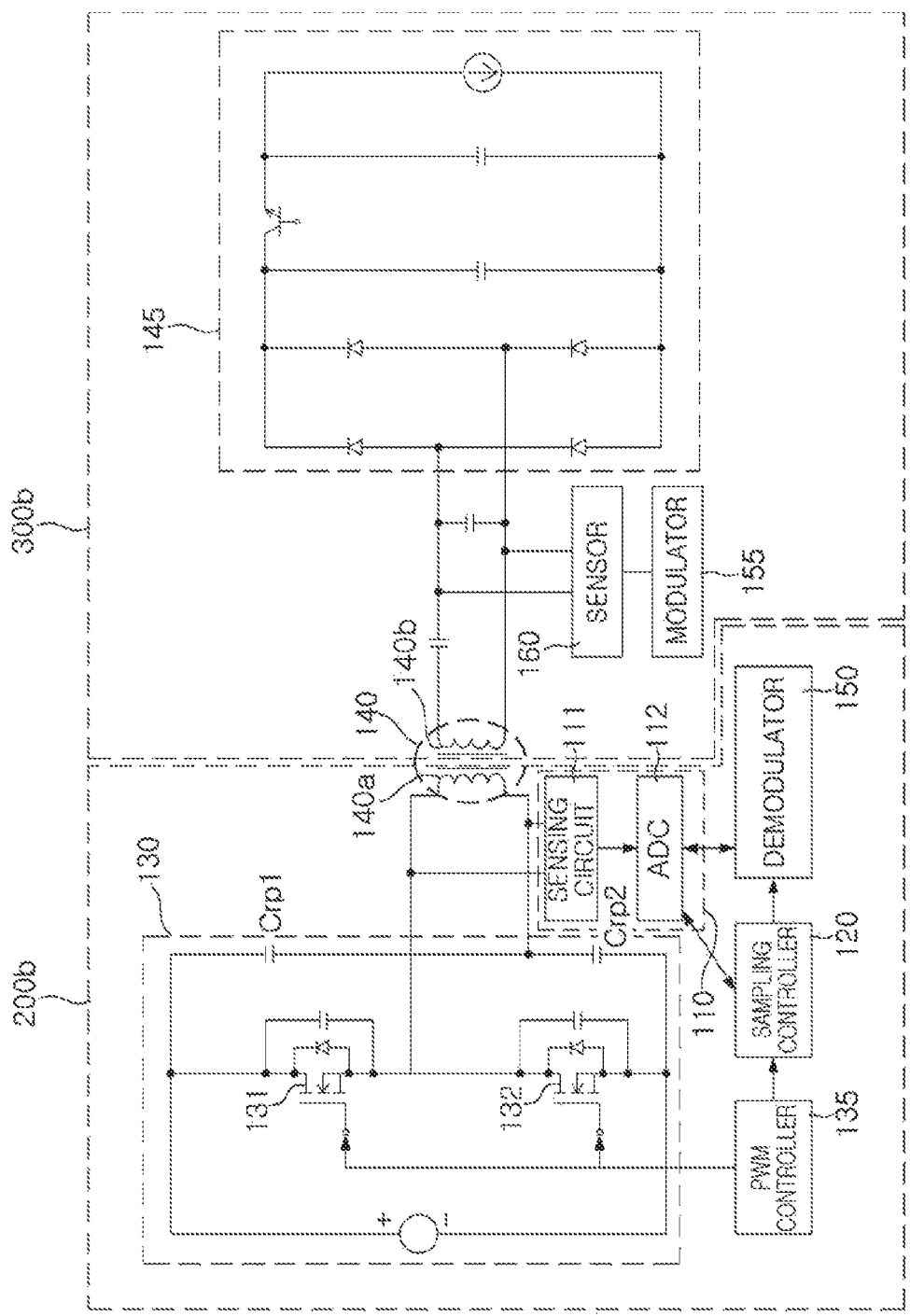
FIG. 2 is a diagram illustrating an example of a wireless power transmitter and receiver.

FIG. 2 is a diagram illustrating an example of a wireless power transmitter and receiver.

Referring to FIG. 2, a wireless power transmission transmitter 200b includes a sensing circuit 111, an analog-to-digital converter (ADC) 112, the sampling controller 120, the converter 130, a pulse width modulation (PWM) controller 135, a transmit coil 140a, a rectifier 145, and a demodulator 150. In addition, a wireless power transmission receiver 300b includes, a receive coil 140b, a modulator 155 and a sensor 160.

In the example of the sampling unit illustrated in FIG. 1, the sampling unit includes the sensing circuit 111 and the ADC 112.

The sensing circuit 111 is tapped to the winding of transmit coil 140a. The sensing circuit 111 repeatedly switches between an activation state and a non-activation state at a sampling frequency, and samples the winding of transmit coil 140a by outputting an analog value having the same voltage as a voltage of the transmit coil 140a in an activation state.

The ADC 112 converts the analog value output by the sensing circuit 111 into a digital value. The ADC 112 may operate based on the sampling frequency.

The converter 130 includes a plurality of semiconductor switches 131 and 132, and a plurality of capacitors Crp1 and Crp2, and switches an on-off state of the plurality of semiconductor switches 131 and 132 based on the frequency of the carrier frequency signal, to generate wireless power and/or the carrier frequency signal.

The PWM controller 135 applies a switching signal to gate terminals of the plurality of semiconductor switches 131 and 132 to control a switching operation of the converter 130. In an example, a waveform of the switching signal has a high value in a period of time in which the switching signal is active, and a low value during the remaining period of time. Thus, the switching signal has a duty cycle. The PWM controller 135 performs PWM (pulse width modulation) for the switching signal by modulating the duty cycle of the switching signal. The level of the wireless power generated by the converter 130 is determined by the duty cycle.

In addition, the PWM controller 135 may change the frequency or the duty cycle of the carrier frequency signal through a control operation. When the frequency or the duty cycle is changed, the sampling point of time of the sensing circuit 111 deviates from the point of time at which the carrier frequency signal has the peak value. Therefore, when the frequency or the duty cycle is changed, the PWM controller 135 transmits frequency information or duty cycle information to the sampling controller 120.

Thereafter, the sampling controller 120 again sets the candidate sampling points of time and/or the retrieval sampling points of time, the sensing circuit 111 again performs the sampling at the retrieval sampling points of time which have been set again, and the sampling controller 120 again selects the sampling point of time. As a result, the sensing circuit 111 continuously performs an efficient sampling.

The transmit coil 140a is disposed on the transmitter 200b, and wirelessly transmits power to the receive coil 140b in the receiver 300b. If the wireless power transmission system wirelessly transmits/receives power through magnetic induction, the transmit coil 140a magnetically couples to receive coil 140b included in the receiver 300b. If the wireless power transmission system wirelessly transmits/receives power through magnetic resonance, the transmit coil 140a will have the same resonance frequency as the receive coil 140 b.

The rectifier 145 rectifies and converts alternating current transmitted wirelessly by transmit coil 140a into a direct current, using a plurality of diodes.

The demodulator 150 detects the phase or the envelope of the carrier frequency signal, based on the digital value converted by the ADC 112. The envelope corresponds to information communicated between the transmitter 200b and the receiver 300b, and may be varied in every predetermined period. In one example, the envelope is sequentially varied based on a code corresponding to the communicated information. The demodulator 150 sequentially detects the envelope, and extracts information corresponding to the sequential variation of the envelope.

The modulator 155 reflects the envelope corresponding to the information communicated between the transmitter 200b and the receiver 300b that is modulated on the carrier frequency signal. That is, the modulator 155 operates based on an operation sequence that is inverse to the operation sequence of the demodulation 150. If the demodulator 150 is included in the transmitter 200b, the modulator 155 is included in the receiver 300b. For example, the modulator 155 may reflect the envelope corresponding to the communicated information to the carrier frequency signal through load modulation of the receiver 300b.

The sensor 160 is tapped to the winding of receive coil 140b and senses a level of voltage or current of a second node through which the carrier frequency signal passes in the receiver 300b. If the point at which the sensing circuit 111 performs the sampling is positioned in the transmitter 200b, the second node may be positioned in a load of the receiver 300b.

If the load of the receiver 300b is changed or a distance between the receiver 300b and the transmitter 200b is changed, the phase of the carrier frequency signal of the transmitter 200b is varied. If the phase of the carrier frequency signal of the transmitter 200b is varied, the level of the voltage or the current of the second node may be changed to a reference level or more.

The sensor 160 determines the varied phase of the carrier frequency signal of the transmitter 200b by sensing a change in the level of the voltage or the current of the second node.

If the phase of the carrier frequency signal is varied, the sampling point of time of the sensing circuit 111 deviates from the point of time at which the carrier frequency signal has the peak value. Therefore, the sensor 160 transmits the sensing result to the sampling controller 120.

Thereafter, the sampling controller 120 sets the candidate sampling points of time and/or the retrieval sampling points of time, the sensing circuit 111 performs the sampling at the retrieval sampling points of time which have been set, and the sampling controller 120 selects the sampling point of time. As a result, the sensing circuit 111 continuously performs efficient sampling.

Figure 3:
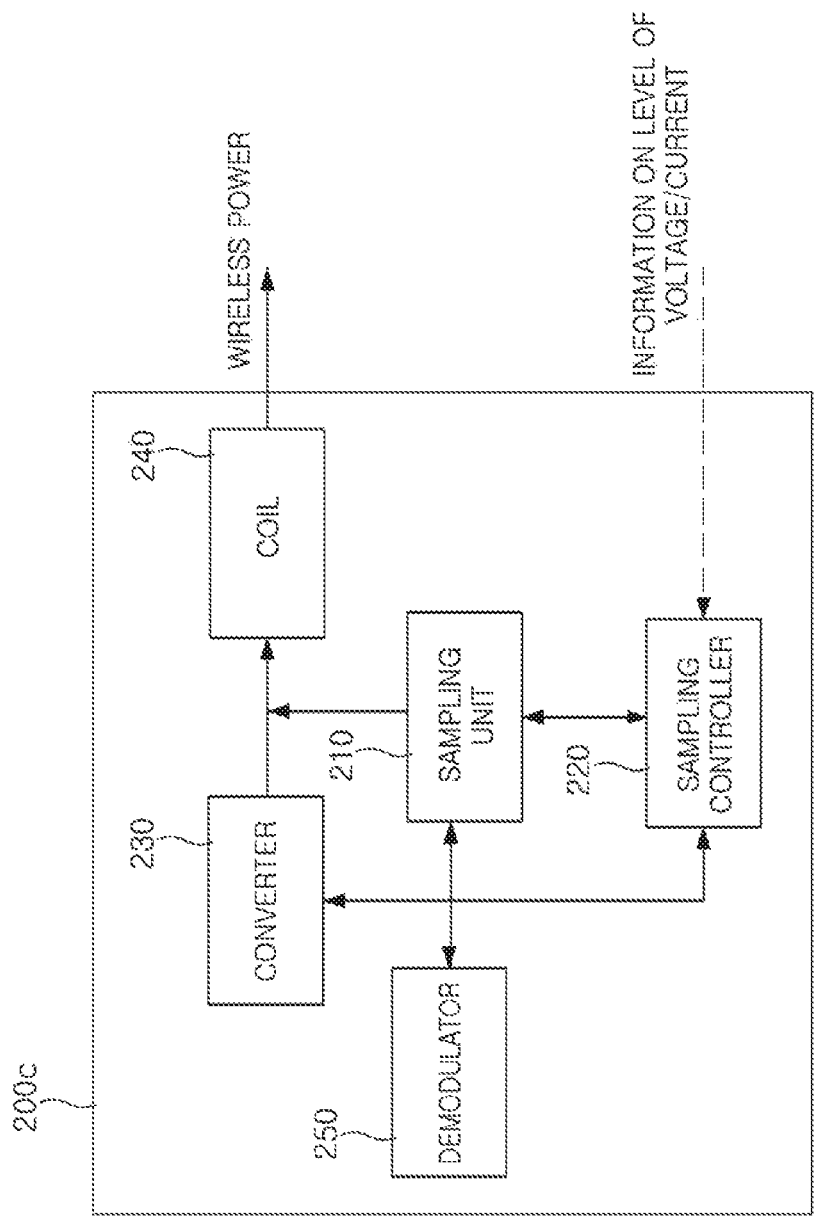
FIG. 3 is a block diagram illustrating a wireless power transmitter.

FIG. 3 is a diagram illustrating an example of a wireless power transmitter.

Referring to FIG. 3, a wireless power transmitter 200c includes a sampling unit 210, a sampling controller 220, a converter 230, a coil 240, and a demodulator 250.

The sampling unit 210 and the controller 220 perform substantially the same operations as those of the sampling unit and the sampling controller, respectively, illustrated in FIG. 1, and are disposed within the wireless power transmitter 200c.

The converter 230, the coil 240, and the demodulator 250 perform substantially the same operations as those of the converter, the coil, and the demodulator, respectively, illustrated in FIG. 2, and may be disposed within the wireless power transmitter 200c.

In addition, the sampling controller 220 receives information on a level of voltage or current of a load from a wireless power receiver, and resets different retrieval sampling points of time for each of the sections, among the candidate sampling points of time, when the level of the voltage or the current of the load is changed to a reference level or more.

As a result, the wireless power transmitter 200c using a low sampling rate continuously and stably perform comparably to results obtained using a relatively high sampling frequency.

Figure 4:
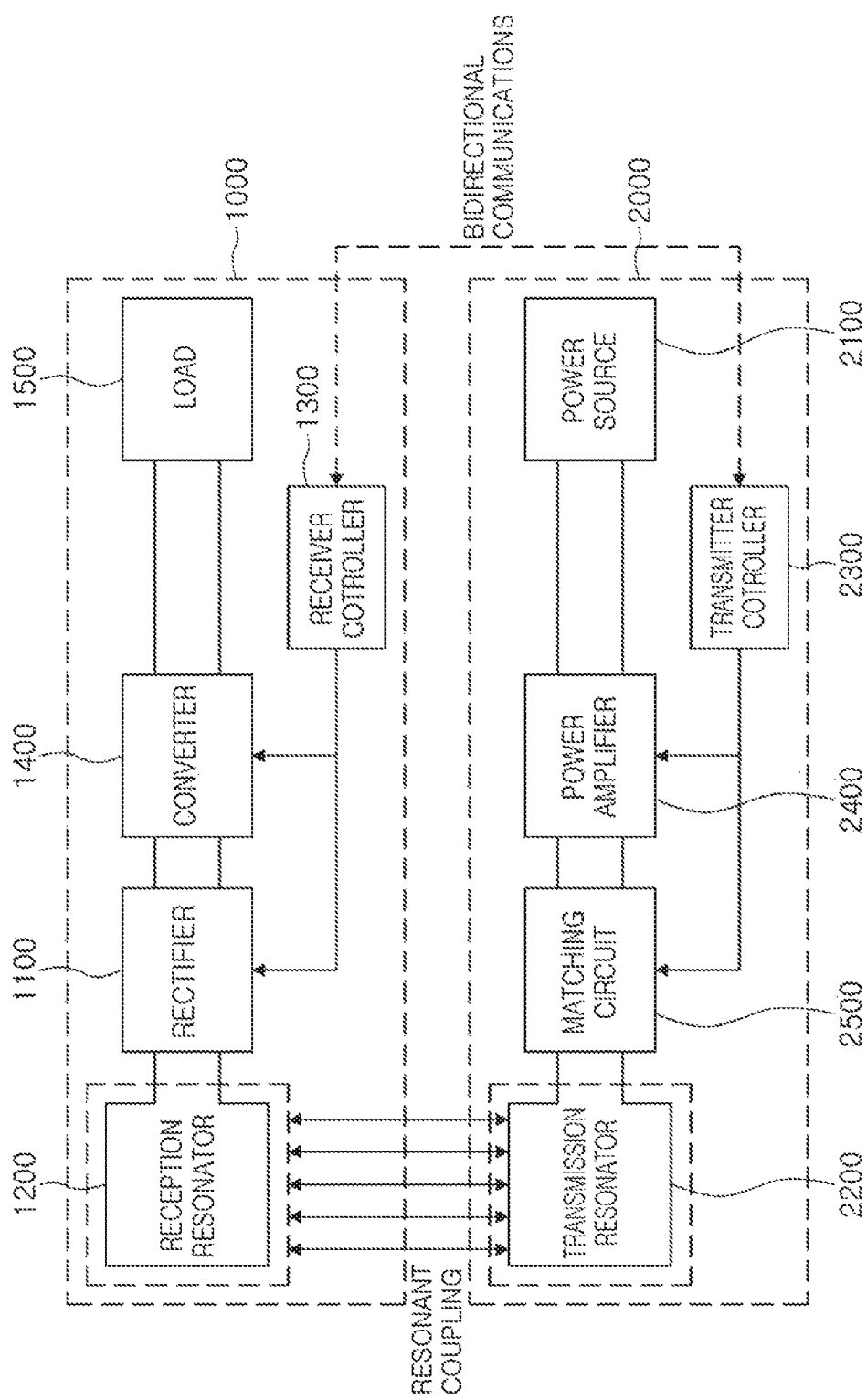
FIG. 4 is a block diagram illustrating the wireless power transmission system.

FIG. 4 is a block diagram illustrating the wireless power transmission system.

Referring to FIG. 4, the wireless power transmission system includes a wireless power receiver 1000 and a wireless power transmitter 2000.

The wireless power receiver 1000 includes a rectifier 1100, a reception resonator 1200, a receiver controller 1300, a converter 1400, and a load 1500.

The wireless power transmitter 2000 includes a power source 2100, a transmission resonator 2200, a transmitter controller 2300, a power amplifier 2400, and a matching circuit 2500.

The rectifier 1100 rectifies the received power, and also removes harmonic waves generated in the rectification operation.

The reception resonator 1200 is resonantly coupled to the transmission resonator 2200. That is, the reception resonator 1200 substantially has the same resonance frequency as the transmission resonator 2200.

The receiver controller 1300 controls operations of the wireless power receiver 1000. For example, the receiver controller 1300 may include a microcontroller unit (MCU) to perform a control process and to perform bidirectional communications with the transmitter controller 2300.

The converter 1400 converts voltages of the power rectified by the rectifier 1100. For example, the converter 1400 may include a DC-DC converter to step up or step down the rectified power.

The load 1500 supplies the power converted by the converter 1400 to a device that requires the converted power.

The power source 2100 stores power to be transmitted to the wireless power transmitter 2000. For example, the power source 2100 may include a battery for receiving and storing power from the outside via a wire, an inverter for inverting the stored power, and a switch for performing a switching operation between the battery and the inverter.

The transmission resonator 2200 is coupled resonantly to the reception resonator 2200.

The transmitter controller 2300 controls operations of the wireless power transmitter 2000. For example, the transmitter controller 2300 may include a microcontroller unit (MCU) to perform a control process and to perform bidirectional communications with the receiver controller 1300.

The power amplifier 2400 amplifies the power input from the power source 2100 to transmit the amplified power to the transmission resonator 2200.

The matching circuit 2500 matches impedance to reduce power loss generated when the power amplified by the power amplifier 2400 is transmitted to the transmission resonator 2200.

Figure 5:
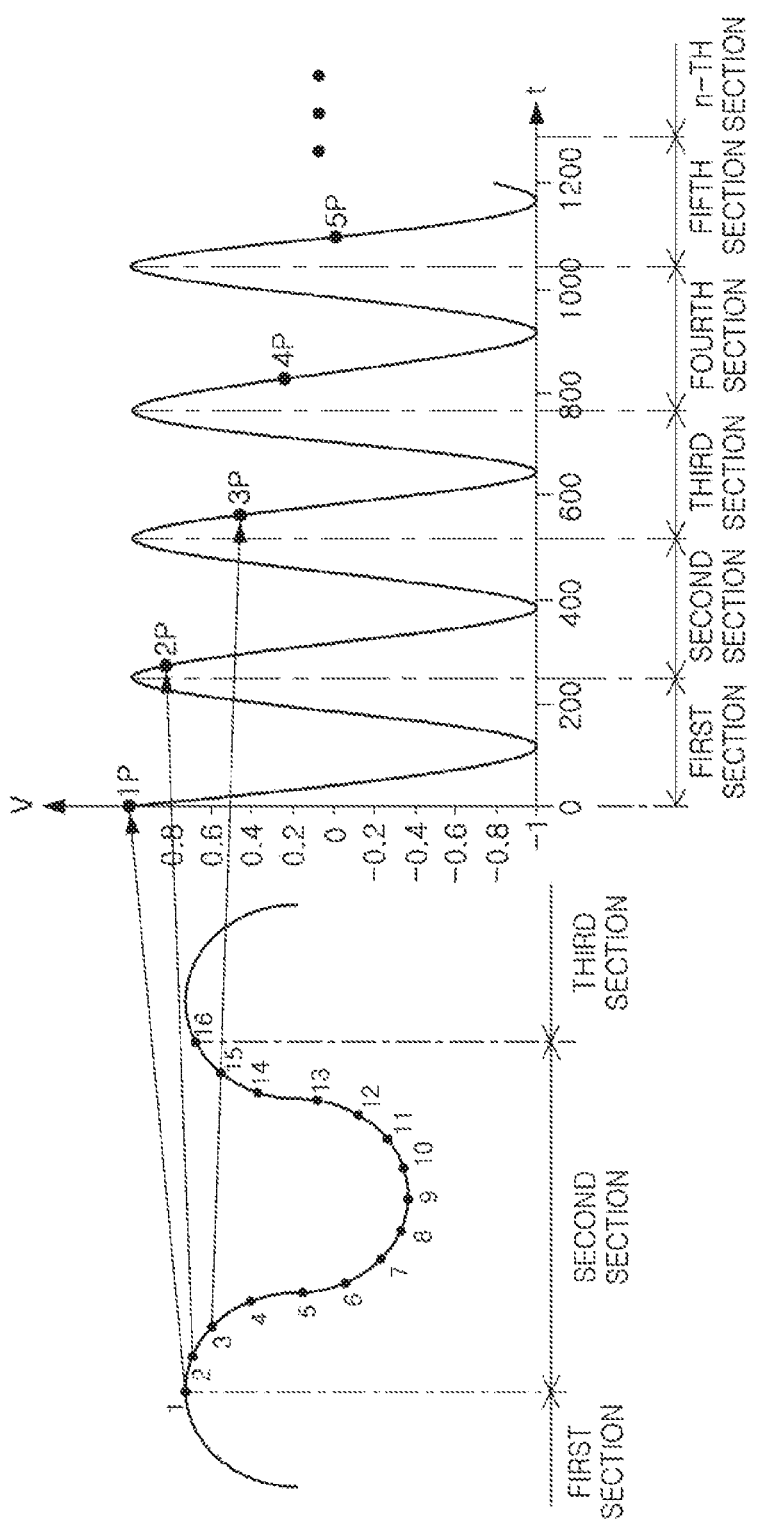
FIG. 5 is a diagram illustrating an example of candidate sampling points of time and retrieval sampling points of time that are set by a sampling controller.

FIG. 5 is a diagram illustrating an example of candidate sampling points of time and retrieval sampling points of time that are set by a sampling controller.

Referring to FIG. 5, each of first to n-th sections has candidate sampling points and retrieval sampling points of time. FIG. 5 depicts 16 candidate sampling points of time 1-16 with each of the candidate sampling points having one of retrieval sampling points of time 1p, 2p, 3p, 4p, and 5p.

In addition, each of the candidate sampling points of time 1-16 corresponds to one of the retrieval sampling points of time 1p, 2p, 3p, 4p, and 5p.

Here, a time difference between a sampling point of time of one of the first to n-th sections and a sampling point of time of an adjacent section may be [(n+1)/n] times of a period of one of the first to n-th sections. That is, since the sampling frequency of the sampling unit is [(n/(n+1)] times the carrier frequency, the sampling frequency is lower than the carrier frequency. Therefore, the sampling at the retrieval sampling points of time 1p, 2p, 3p, 4p, and 5p of the sampling unit does not require a high sampling frequency, which would result in cost savings, size reduction, and reduced power consumption of the sampling unit.

The retrieval sampling points of time do not need to sequentially correspond to the candidate sampling points of time. For example, in a case in which the number of the candidate sampling points of time is an odd number, a k-th retrieval sampling point of time will correspond to a (2k)-th candidate sampling point of time, and a (2k−1)-th candidate sampling point of time will correspond to a [(n/2)+k]-th retrieval sampling point of time. That is, the correspondence between the retrieval sampling point of time and the candidate sampling point of time may be set by various principles.

as Although, as the number of the candidate sampling points of time increases, sampling accuracy will become higher but the retrieval time of the sampling point will also increase correspondingly.

Therefore, the sampling controller determines the required number of the candidate sampling points of time based on a physically required standard or a communications standard of the wireless power transmitter and receiver. Thus, the number of the sampling points of time does not need to be artificially limited to a predetermined number, e.g., 16 as illustrated in FIG. 5.

Figure 6:
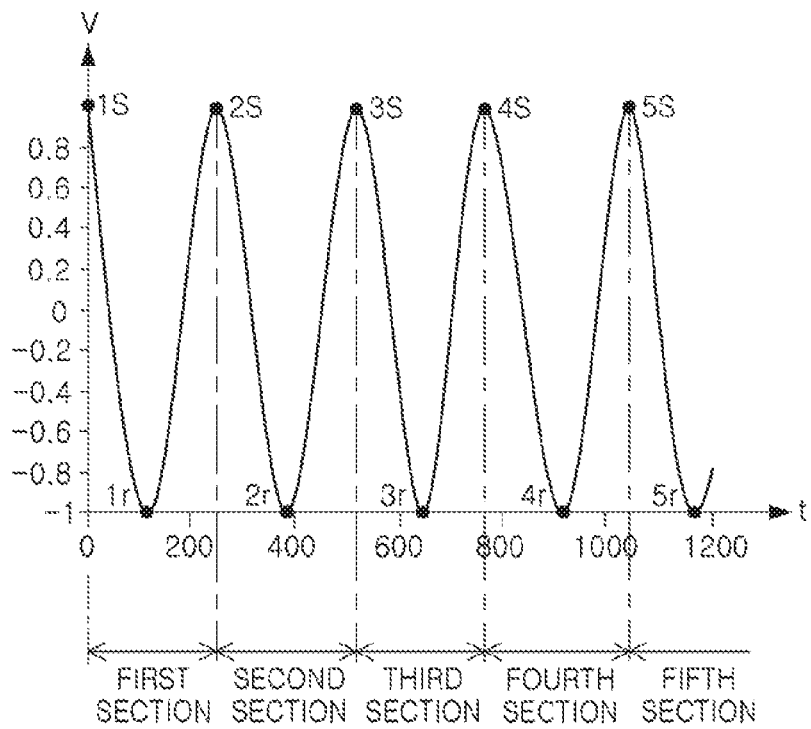
FIG. 6 is a diagram illustrating an example of determined sampling points of time determined by the sampling controller.

FIG. 6 is a diagram illustrating an example of sampling points of time selected by the sampling controller.

Referring to FIG. 6, sampling points of time 1s, 2s, 3s, 4s, and 5s are selected as points of time at which the carrier frequency signal has a positive peak value, and additional sampling points of time 1r, 2r, 3r, 4r, and 5r are selected as points of time at which the carrier frequency signal has a negative peak value.

The wireless power transmitter depicted in the figures may utilize both the sampling points of time 1s, 2s, 3s, 4s, and 5s and the additional sampling points of time 1r, 2r, 3r, 4r, and 5r, to remove noise, offset, and clock error included in the carrier frequency signal. In one example, the wireless power transmitter detects the amplitude or the envelope of the carrier frequency signal, based on a value obtained by dividing a sum of absolute values of the sampling points of time 1s, 2s, 3s, 4s, and 5s, and the additional sampling points of time 1r, 2r, 3r, 4r, and 5r, in half.

Figure 7:
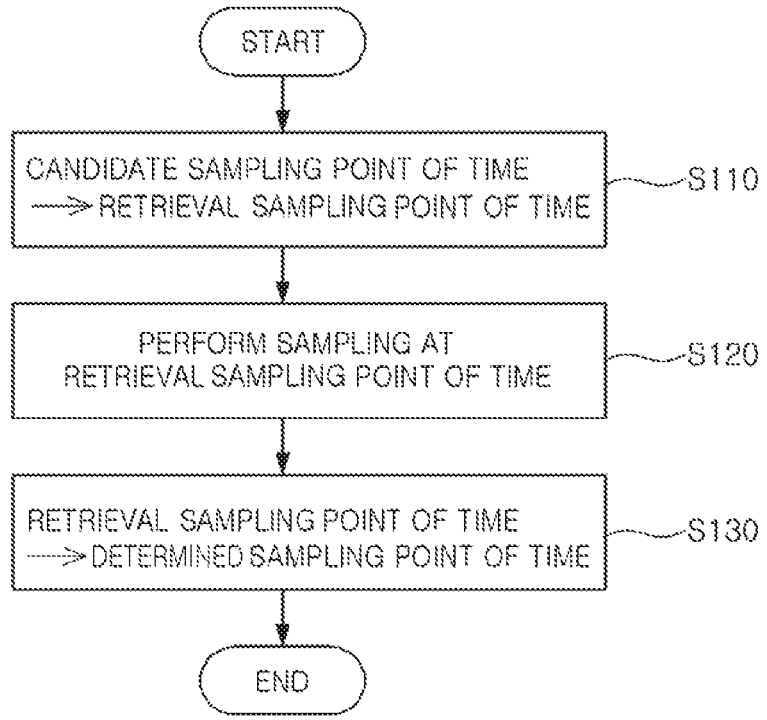
FIG. 7 is a flow chart illustrating an example of a method for controlling a sampling of a wireless power transmitter.

FIG. 7 is a flow chart illustrating an example of a method for controlling a sampling of a wireless power transmitter.

Referring to FIG. 7, the sampling controller sets the retrieval sampling points of time based on the candidate sampling points of time (S110). The sampling unit performs the sampling based on the retrieval sampling points of time (S120). The sampling controller selects the sampling point of time from a sampling result (S130). Next, the sampling unit performs the sampling based on the selected sampling point of time.

Figure 8:
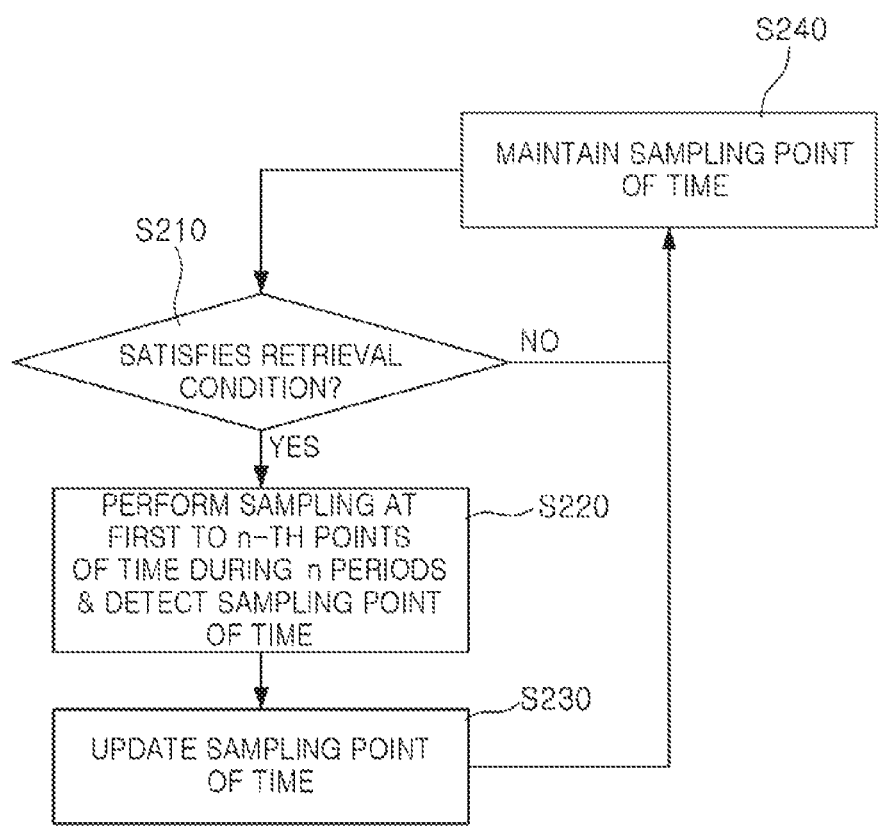
FIG. 8 is a flow chart illustrating an operation of determining a retrieval condition of the sampling controller.

FIG. 8 is a flow chart illustrating an example of an operation determining retrieval conditions of the sampling controller.

Referring to FIG. 8, the sampling controller checks whether the wireless power transmission system satisfies a retrieval condition (S210). If the wireless power transmission system satisfies a retrieval condition, sampling is performed at first to n-th points of time during n periods to determine candidate sampling points and sampling points of time (S220). The sampling points of time is then updated (S230), and maintained (S240). However, if the wireless power transmission system does not satisfy the retrieval condition, the sampling point of time is maintained (S240).

Figure 9:
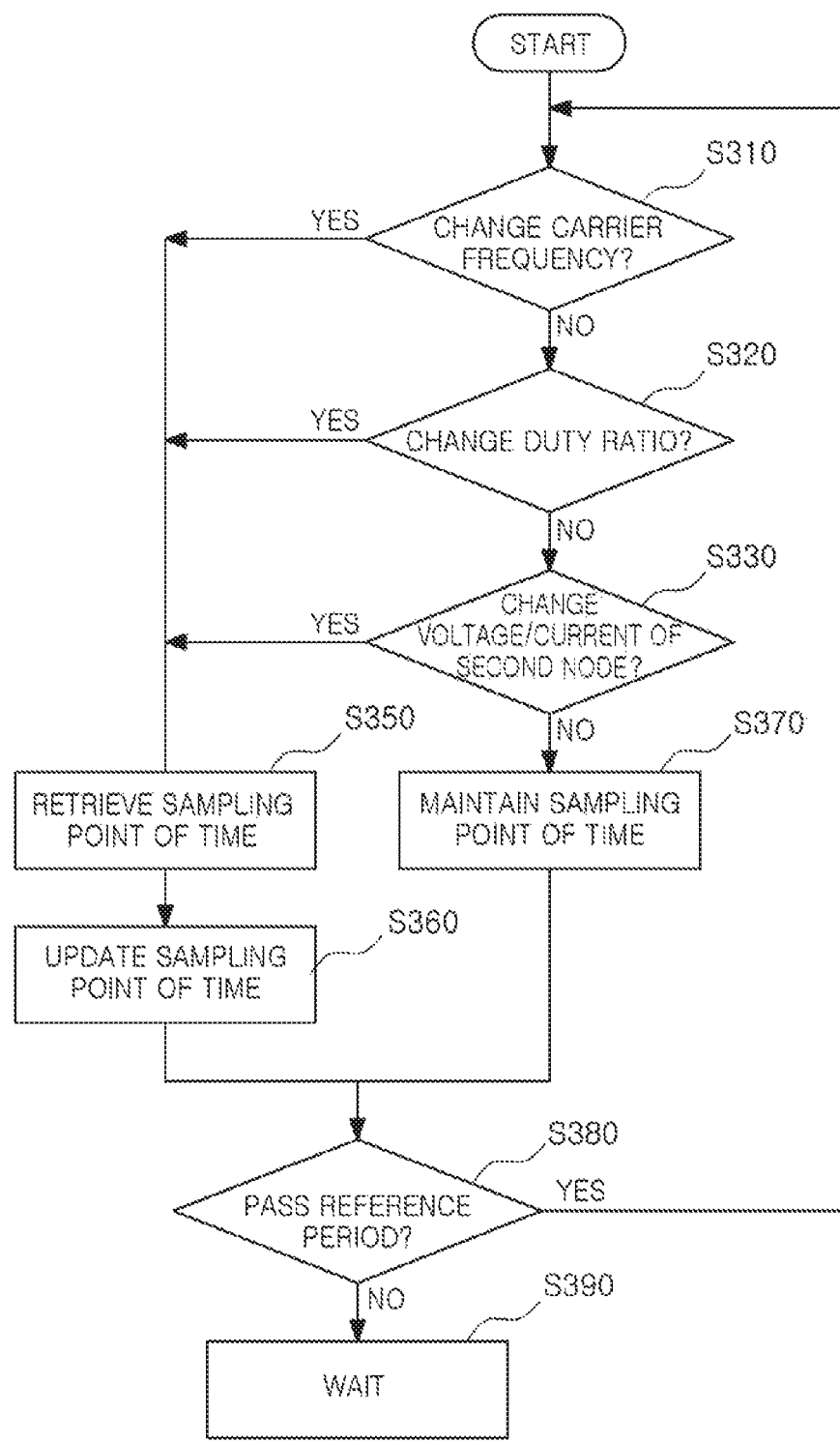
FIG. 9 is a flow chart illustrating the operation of determining the retrieval condition of the sampling controller in detail.

FIG. 9 is a flow chart illustrating the operation of determining the retrieval condition of the sampling controller, in detail.

Referring to FIG. 9, the sampling controller checks whether the frequency of the carrier frequency signal has changed (S310). If the frequency of the carrier frequency signal has not changed, a check is made whether the switching duty cycle of the converter has changed (S320). If there is no change in the duty cycle, a check is made whether the voltage or the current of the second node has changed (S330). If there's no change in the voltage or the current of the second node, the sampling point of time is maintained (S370).

If there's a change in the voltage or the current of the second node, the frequency of the carrier frequency signal, or the duty cycle the sampling points of time (S350) are retrieved. After retrieving the sampling points of time, an update is made to the sampling points of time (S360).

After the update is made to the sampling points of time (S360) and the sampling point of time is maintained (S370), a check is made whether an elapsed time from a point of time at which a retrieval condition determination starts has passed a reference period (S380), and if the elapsed time has not passed the reference period, the process waits (S390) until passage of the elapsed time before checking for a change in the carrier frequency (S310).

As set forth above, based on the examples in the present disclosure, the wireless power transmitter performs similarly to performance obtained by sampling at the relatively high sampling frequency, while sampling at the relatively low frequency. Hardware requirements for sampling at a relatively low frequency reduces cost, size and power consumption when compared to hardware requirements for sampling at a higher frequency.

In addition, the wireless power transmitter based on the examples will detect phase changes of the carrier frequency while performing efficiently.

The sampling controllers 120, 220 that perform the operations described in FIGS. 7-9 of this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 7-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmitter, comprising:
a sampling controller setting different retrieval sampling points of time for each section, among candidate sampling points of time, in each section of a carrier frequency signal; and
a sampler configured to sample points of the carrier frequency signal at the different retrieval sampling points of time,
wherein the sampling controller compares values sampled by the sampler with each other, and determines a determined sampling point based on a comparison result.

2. The wireless power transmitter of claim 1, wherein the sampler samples at a point of time corresponding to the determined sampling point for each of the plurality of sections of the carrier frequency signal.

3. The wireless power transmitter of claim 1, further comprising a demodulator configured to detect a phase or an envelope of the carrier frequency signal, based on the determined sampling point.

4. The wireless power transmitter of claim 1, wherein the determined sampling point is the largest value or the smallest value of the values sampled by the sampler.

5. The wireless power transmitter of claim 1, wherein the sections include first to n-th sections,
the candidate sampling points of time includes first to n-th points, and
the sampling controller sets a k-th point of a k-th section as the sampling point of time, where n and k are natural numbers and n is greater than k.

6. The wireless power transmitter of claim 1, wherein a time difference between a retrieval sampling point of time of one of the sections and a retrieval sampling point of time of an adjacent section is [(n+1)/n] multiples of a period of one of the plurality of sections, where n is a natural number.

7. The wireless power transmitter of claim 1, wherein the sampling controller determines whether a state of the transmitter satisfies a retrieval condition in every reference period, and
when the state satisfies the retrieval condition, resets different retrieval sampling points of time for each section among the candidate sampling points of time.

8. The wireless power transmitter of claim 7, further comprising a converter having switches configured to switch based on a frequency of the carrier frequency signal to generate wireless power or the carrier frequency signal,
wherein the retrieval condition includes a first case in which an operation frequency of the converter is changed and a second case in which a duty cycle of the converter is changed.

9. The wireless power transmitter of claim 8, further comprising a sensor configured to sense a level of voltage or current of a second node through which the carrier frequency signal passes in the transmitter, the second node being different from a sampling node of the sampler,
wherein the retrieval condition includes a third case in which the level of the voltage or the current sensed by the sensing unit is changed to at least a reference level.

10. The wireless power transmitter of claim 9, wherein the sampling controller receives information on a level of voltage or current of a load from a wireless power receiver, and
the retrieval condition includes a fourth case in which the level of the voltage or the current of the load is changed to at least a reference level.

11. The wireless power transmitter of claim 1, further comprising a coil disposed on the transmitter and transmitting power wirelessly to a receiver,
wherein the sampler is configured to sample a level of voltage or current of the coil.

12. A method for controlling a sampling of a wireless power transmitter, comprising:
setting different retrieval sampling points of time for each section among candidate sampling points of time in each section of a carrier frequency signal;
sampling points of the carrier frequency signal at the different retrieval sampling points of time; and
comparing values sampled by the sampler with each other and determining a determined sampling point based on a comparison result.

13. The method of claim 12, further comprising:
performing the sampling at a point of time corresponding to the determined sampling point for each section of the carrier frequency signal;
receiving information on a level of voltage or current of a load from a wireless power receiver in every reference period; and
when the level of the voltage or the current of the load is changed to at least a reference level, resetting different retrieval sampling points of time for each of the sections among the candidate sampling points of time.

14. A wireless power transmitter configured to determine n candidate sampling points of time for sections of a carrier frequency signal, determine one of k retrieval sampling points for each of the candidate sampling points of time, sample the carrier frequency signal based on the selected sampling point of time,
wherein n and k are natural numbers, and n is greater than k.

15. The wireless power transmitter of claim 14, wherein the carrier frequency signal is sampled at a sampling frequency of [(n/(n+1)] times the carrier frequency.

16. The wireless power transmitter of claim 15, wherein when the candidate sampling points of time is an odd number, a k-th retrieval sampling point of time will correspond to a (2k)-th candidate sampling point of time, and a (2k−1)-th candidate sampling point of time will correspond to a [(n/2)+k]-th retrieval sampling point of time.

17. The wireless power transmitter of claim 15, wherein the sampling points of time are selected as points of time at which the carrier frequency signal has a positive peak value.

18. The wireless power transmitter of claim 17, wherein additional sampling points of time are selected as points of time at which the carrier frequency signal has a negative peak value.

19. The wireless power transmitter of claim 18, wherein an amplitude or an envelope of the carrier frequency signal is determined based on a value obtained by dividing a sum of absolute values of the sampling points of time and the additional sampling points of time in half.

20. The wireless power transmitter of claim 14, wherein a sampling controller sets the retrieval sampling points and a sampler performs the sampling based on the retrieval sampling points of time.

* * * * *